(12) United States Patent
Furman et al.

(10) Patent No.: US 8,179,318 B1
(45) Date of Patent: May 15, 2012

(54) PRECISE POSITION DETERMINATION USING VHF OMNI-DIRECTIONAL RADIO RANGE SIGNALS

(75) Inventors: Scott Furman, Menlo Park, CA (US); Guttorm Opshaug, Menlo Park, CA (US)

(73) Assignee: TruePosition, Inc., Berwyn, PA (US)

( * ) Notice: Subject to any disclaimer, the term of this patent is extended or adjusted under 35 U.S.C. 154(b) by 0 days.

(21) Appl. No.: 12/556,714

(22) Filed: Sep. 10, 2009

Related U.S. Application Data

(62) Division of application No. 11/535,485, filed on Sep. 27, 2006, now abandoned.

(60) Provisional application No. 60/721,562, filed on Sep. 28, 2005, provisional application No. 60/726,510, filed on Oct. 13, 2005, provisional application No. 60/748,331, filed on Dec. 7, 2005.

(51) Int. Cl.
*G01S 1/44* (2006.01)

(52) U.S. Cl. ...................................................... 342/404

(58) Field of Classification Search ............ 342/404–411
See application file for complete search history.

(56) References Cited

U.S. PATENT DOCUMENTS

| | | | |
|---|---|---|---|
| 3,386,096 A * | 5/1968 | Lundgreen et al. ............ | 342/401 |
| 4,447,814 A * | 5/1984 | Treise ............................ | 342/401 |
| 4,555,707 A | 11/1985 | Connelly | |
| 4,652,884 A | 3/1987 | Starker | |
| 4,700,306 A | 10/1987 | Wallmander | |
| 4,894,662 A | 1/1990 | Counselman | |
| 5,045,861 A | 9/1991 | Duffett-Smith | |
| 5,157,686 A | 10/1992 | Omura et al. | |
| 5,166,952 A | 11/1992 | Omura et al. | |
| 5,271,034 A | 12/1993 | Abaunza | |
| 5,323,322 A | 6/1994 | Mueller et al. | |
| 5,398,034 A | 3/1995 | Spilker, Jr. | |
| 5,481,316 A | 1/1996 | Patel | |
| 5,504,492 A | 4/1996 | Class et al. | |
| 5,510,801 A | 4/1996 | Engelbrecht et al. | |
| 5,604,765 A | 2/1997 | Bruno et al. | |
| 5,630,206 A | 5/1997 | Urban et al. | |
| 5,648,982 A | 7/1997 | Durrant et al. | |
| 5,774,829 A | 6/1998 | Cisneros et al. | |
| 5,784,339 A | 7/1998 | Woodsum et al. | |

(Continued)

FOREIGN PATENT DOCUMENTS

DE 3242997 A1 5/1984

(Continued)

OTHER PUBLICATIONS

U.S. Appl. No. 10/008,613, Pierce, et al.

(Continued)

*Primary Examiner* — Thomas Tarcza
*Assistant Examiner* — Nga X Nguyen
(74) *Attorney, Agent, or Firm* — Woodcock Washburn LLP

(57) ABSTRACT

Apparatus having corresponding methods and computer programs comprise a wireless receiver to receive a Very High Frequency (VHF) Omni-directional Radio Range (VOR) signal comprising a frequency-modulated (FM) component; an analog-to-digital converter to generate a digital signal based on the VOR signal, the digital signal comprising data representing the FM component; and a FM phase circuit comprising a correlator to generate a correlation peak based on the data representing the FM component and an ideal representation of the FM component, and a peak detector to determine a phase of the FM component based on the correlation peak.

14 Claims, 5 Drawing Sheets

U.S. PATENT DOCUMENTS

| | | | |
|---|---|---|---|
| 5,835,060 | A | 11/1998 | Czarnecki et al. |
| 5,920,284 | A | 7/1999 | Victor |
| 5,952,958 | A | 9/1999 | Speasl et al. |
| 5,953,311 | A | 9/1999 | Davies et al. |
| 6,006,097 | A | 12/1999 | Hornfeldt et al. |
| 6,016,119 | A | 1/2000 | Krasner |
| 6,078,284 | A | 6/2000 | Levanon |
| 6,094,168 | A | 7/2000 | Duffett-Smith et al. |
| 6,107,959 | A | 8/2000 | Levanon |
| 6,137,441 | A | 10/2000 | Dai et al. |
| 6,144,413 | A | 11/2000 | Zatsman |
| 6,147,642 | A | 11/2000 | Perry et al. |
| 6,181,921 | B1 | 1/2001 | Konisi et al. |
| 6,184,921 | B1 | 2/2001 | Limberg |
| 6,201,497 | B1 | 3/2001 | Snyder et al. |
| 6,215,778 | B1 | 4/2001 | Lomp et al. |
| 6,289,280 | B1 | 9/2001 | Fernandez-Corbaton et al. |
| 6,317,452 | B1 | 11/2001 | Durrant et al. |
| 6,317,500 | B1 | 11/2001 | Murphy |
| 6,373,432 | B1 | 4/2002 | Rabinowitz et al. |
| 6,374,177 | B1 | 4/2002 | Lee et al. |
| 6,400,753 | B1 | 6/2002 | Kohli et al. |
| 6,433,740 | B1 | 8/2002 | Gilhousen |
| 6,437,832 | B1 | 8/2002 | Grabb et al. |
| 6,484,034 | B1 | 11/2002 | Tsunehara et al. |
| 6,522,297 | B1 | 2/2003 | Rabinowitz et al. |
| 6,559,800 | B2 | 5/2003 | Rabinowitz et al. |
| 6,559,894 | B2 | 5/2003 | Omura et al. |
| 6,590,529 | B2 | 7/2003 | Schwoegler |
| 6,646,603 | B2 | 11/2003 | Dooley et al. |
| 6,717,547 | B2 | 4/2004 | Spilker, Jr. et al. |
| 6,727,847 | B2 | 4/2004 | Rabinowitz et al. |
| 6,753,812 | B2 | 6/2004 | Rabinowitz et al. |
| 6,806,830 | B2 | 10/2004 | Panasik et al. |
| 6,839,024 | B2 | 1/2005 | Spilker, Jr. et al. |
| 6,859,173 | B2 | 2/2005 | Spilker, Jr. et al. |
| 6,861,984 | B2 | 3/2005 | Rabinowitz et al. |
| 6,879,286 | B2 | 4/2005 | Rabinowitz et al. |
| 6,914,560 | B2 | 7/2005 | Spilker, Jr. et al. |
| 6,917,328 | B2 | 7/2005 | Rabinowitz et al. |
| 6,937,866 | B2 | 8/2005 | Duffett-Smith et al. |
| 6,952,182 | B2 | 10/2005 | Spilker, Jr. et al. |
| 6,961,020 | B2 | 11/2005 | Rabinowitz et al. |
| 6,963,306 | B2 | 11/2005 | Spilker, Jr. et al. |
| 6,970,132 | B2 | 11/2005 | Spilker, Jr. et al. |
| 7,042,396 | B2 | 5/2006 | Omura et al. |
| 7,042,949 | B1 | 5/2006 | Omura et al. |
| 7,126,536 | B2 | 10/2006 | Rabinowitz et al. |
| 7,260,378 | B2 | 8/2007 | Holland et al. |
| 7,269,424 | B2 | 9/2007 | Camp, Jr. |
| 7,372,405 | B2 | 5/2008 | Rabinowitz et al. |
| 7,463,195 | B2 | 12/2008 | Rabinowitz et al. |
| 7,466,266 | B2 | 12/2008 | Opshaug |
| 7,471,244 | B2 | 12/2008 | Omura et al. |
| 2002/0122003 | A1 | 9/2002 | Patwari et al. |
| 2002/0168988 | A1 | 11/2002 | Younis |
| 2002/0184653 | A1 | 12/2002 | Pierce et al. |
| 2003/0162547 | A1 | 8/2003 | McNair |
| 2004/0073914 | A1 | 4/2004 | Spilker, Jr. |
| 2004/0201779 | A1 | 10/2004 | Spilker, Jr. |
| 2005/0066373 | A1 | 3/2005 | Rabinowitz |
| 2005/0251844 | A1 | 11/2005 | Martone et al. |
| 2007/0050824 | A1 | 3/2007 | Lee et al. |
| 2007/0121555 | A1 | 5/2007 | Burgess et al. |
| 2007/0131079 | A1 | 6/2007 | Opshaug et al. |
| 2009/0070847 | A1 | 3/2009 | Furman et al. |
| 2009/0175379 | A1 | 7/2009 | Rubin et al. |

FOREIGN PATENT DOCUMENTS

| | | |
|---|---|---|
| EP | 58129277 | 8/1983 |
| GB | 2 222 922 A | 3/1990 |
| GB | 2 254 508 A | 10/1992 |

OTHER PUBLICATIONS

U.S. Appl. No. 11/380,691, Metzler, et al.
U.S. Appl. No. 11/622,838, Rabinowitz, et al.
U.S. Appl. No. 11/770,162, Furman, et al.
U.S. Appl. No. 11/865,881, Opshaug, et al.
U.S. Appl. No. 12/209,971, Do, et al.
U.S. Appl. No. 12/263,731, Rabinowitz, et al.
U.S. Appl. No. 12/351,841, Lee, et al.
U.S. Appl. No. 12/476,992, Do, et al.
Parkinson, B.W., et al., "Autonomous GPS Integrity Monitoring Using the Pseudorange Residual," *Journal of the Institute of Navigation* (1988), vol. 35, No. 2, pp. 255-274.
Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59-73.
Spilker, Jr., J.J., "Fundamentals of Signal Tracking Theory," *Global Positioning System: Theory and Applications* (1994), vol. 1, Chapter 7, pp. 245-327.
Van Dierendock, A.J., "GPS Receivers," *Global Positioning System: Theory and Applications* (1995), vol. 1, Chapter 8, pp. 329-407.
Li, X., et al., "Indoor Geolocation Using OFDM Signals in HIPERLAN/2 Wireless LANS," 11th IEEE International Symposium on Personal Indoor and Mobile Radio Communications, PIMRC 2000, Proceedings (Cat. No. 00TH8525), Proceedings of 11th International Symposium on Personal Indoor and Mobile Radio Communication, London, UK, Sep. 18-21, pp. 1449-1453, vol. 2, XP010520871, 2000, Piscataway, NJ, USA, IEEE, USA, ISBN; 9-7803-6463-5, Chapter I and III.
Rabinowitz, M., et al., "Positioning Using the ATSC Digital Television Signal," Rosum whitepaper, Online! 2001, XP002235053, Retrieved from the Internet on Mar. 13, 2003 at URL www.rosum.com/whitepaper 8-7-01.pdf.
So, H., "Implementation of Exact Maximum Likelihood Phase Estimators for a Single Real Sinusoid in White Gaussian Noise," IEICE Trans, Fundamentals, vol. E88-A, No. 7, Jul. 2005.

* cited by examiner

PRECISE POSITION DETERMINATION USING VHF OMNI-DIRECTIONAL RADIO RANGE SIGNALS

CROSS-REFERENCE TO RELATED APPLICATIONS

This application is a divisional of U.S. patent application Ser. No. 11/535,485 filed Sep. 27, 2006, which claims benefit of U.S. Provisional Patent Application Ser. No. 60/721,562 filed Sep. 28, 2005, and which claims benefit of U.S. Provisional Patent Application Ser. No. 60/726,510 filed Oct. 13, 2005, and which claims benefit of U.S. Provisional Patent Application Ser. No. 60/748,331 filed Dec. 7, 2005, the disclosures thereof incorporated by reference herein in their entirety.

BACKGROUND

The present invention relates generally to position determination. More particularly, the present invention relates to precise position determination using Very High Frequency (VHF) Omni-directional Radio Range (VOR) signals.

The VOR signal is a broadcast signal currently used for radionavigation. The VOR signal is a VHF radio signal that encodes both the identity of the VOR transmitter and the azimuth defined by a line extending from the VOR transmitter to a receiver relative to magnetic north.

SUMMARY

In general, in one aspect, the invention features an apparatus comprising: a wireless receiver to receive a Very High Frequency (VHF) Omni-directional Radio Range (VOR) signal comprising a frequency-modulated (FM) component; an analog-to-digital converter to generate a digital signal based on the VOR signal, the digital signal comprising data representing the FM component; and a FM phase circuit comprising a correlator to generate a correlation peak based on the data representing the FM component and an ideal representation of the FM component, and a peak detector to determine a phase of the FM component based on the correlation peak.

In some embodiments, the FM phase circuit comprises: a digital signal processor. Some embodiments comprise an integrator to coherently integrate the digital signal. In some embodiments, an azimuth of the apparatus with respect to a transmitter of the VOR signal is determined based on the phase of the FM component. Some embodiments comprise an azimuth circuit to determine the azimuth of the apparatus based on the phase of the FM component. In some embodiments, a position of the apparatus is determined based on the azimuth of the apparatus. Some embodiments comprise a position circuit to determine the position of the apparatus based on the azimuth of the apparatus. In some embodiments, the VOR signal further comprises an amplitude-modulated (AM) component: wherein the azimuth of the apparatus is determined based on the phase of the FM component and a phase of the AM component. Some embodiments comprise an AM phase circuit to determine the phase of the AM component. In some embodiments, the AM phase circuit determines the phase of the AM component according to an acausal technique. Some embodiments comprise an azimuth circuit to determine the azimuth of the apparatus based on the phase of the FM component and the phase of the AM component. In some embodiments, a position of the apparatus is determined based on the azimuth of the apparatus. Some embodiments comprise a position circuit to determine the position of the apparatus based on the azimuth of the apparatus.

In general, in one aspect, the invention features an apparatus comprising: wireless receiver means for receiving a Very High Frequency (VHF) Omni-directional Radio Range (VOR) signal comprising a frequency-modulated (FM) component; analog-to-digital converter means for generating a digital signal based on the VOR signal, the digital signal comprising data representing the FM component; and correlator means for generating a correlation peak based on the data representing the FM component and an ideal representation of the FM component, and peak detector means for determining a phase of the FM component based on the correlation peak.

Some embodiments comprise integrator means for coherently integrating the digital signal. In some embodiments, an azimuth of the apparatus with respect to a transmitter of the VOR signal is determined based on the phase of the FM component. Some embodiments comprise azimuth means for determining the azimuth of the apparatus based on the phase of the FM component. In some embodiments, a position of the apparatus is determined based on the azimuth of the apparatus. Some embodiments comprise position means for determining the position of the apparatus based on the azimuth of the apparatus. In some embodiments, the VOR signal further comprises an amplitude-modulated (AM) component: wherein the azimuth of the apparatus is determined based on the phase of the FM component and a phase of the AM component. Some embodiments comprise AM phase means for determining the phase of the AM component. In some embodiments, the AM phase means determines the phase of the AM component according to an acausal technique. Some embodiments comprise azimuth means for determining the azimuth of the apparatus based on the phase of the FM component and the phase of the AM component. In some embodiments, a position of the apparatus is determined based on the azimuth of the apparatus. Some embodiments comprise position means for determining the position of the apparatus based on the azimuth of the apparatus.

In general, in one aspect, the invention features a method comprising: receiving a Very High Frequency (VHF) Omni-directional Radio Range (VOR) signal comprising a frequency-modulated (FM) component; generating a digital signal based on the VOR signal, the digital signal comprising data representing the FM component; and determining a phase of the FM component, comprising generating a correlation peak based on the data representing the FM component and reference data, and determining the phase of the FM component based on the correlation peak.

Some embodiments comprise coherently integrating the digital signal. In some embodiments, an azimuth of a receiver of the VOR signal with respect to a transmitter of the VOR signal is determined based on the phase of the FM component. Some embodiments comprise determining the azimuth of the receiver based on the phase of the FM component. In some embodiments, a position of the receiver is determined based on the azimuth of the receiver. Some embodiments comprise determining the position of the receiver based on the azimuth of the receiver. In some embodiments, the VOR signal further comprises an amplitude-modulated (AM) component: wherein the azimuth of the receiver is determined based on the phase of the FM component and a phase of the AM component. Some embodiments comprise determining the phase of the AM component. In some embodiments, the phase of the AM component is determined according to an acausal technique. Some embodiments comprise determining the azimuth of the receiver based on the phase of the FM component and the phase of the AM component. In some embodiments, a position of the receiver is determined based on the azimuth of the receiver. Some embodiments comprise determining the position of the receiver based on the azimuth of the receiver.

In general, in one aspect, the invention features computer-readable media embodying instructions executable by a computer to perform a method comprising: generating a digital signal based on a Very High Frequency (VHF) Omni-directional Radio Range (VOR) signal received by an apparatus, the VOR signal comprising a frequency-modulated (FM) component, the digital signal comprising data representing the FM component; and determining a phase of the FM component, comprising generating a correlation peak based on the data representing the FM component and reference data, and determining the phase of the FM component based on the correlation peak.

In some embodiments, the method further comprises: coherently integrating the digital signal. In some embodiments, an azimuth of a receiver of the VOR signal with respect to a transmitter of the VOR signal is determined based on the phase of the FM component. In some embodiments, the method further comprises: determining the azimuth of the receiver based on the phase of the FM component. In some embodiments, a position of the receiver is determined based on the azimuth of the receiver. In some embodiments, the method further comprises: determining the position of the receiver based on the azimuth of the receiver. In some embodiments, the VOR signal further comprises an amplitude-modulated (AM) component: wherein the azimuth of the receiver is determined based on the phase of the FM component and a phase of the AM component. In some embodiments, the method further comprises: determining the phase of the AM component. In some embodiments, the phase of the AM component is determined according to an acausal technique. In some embodiments, the method further comprises: determining the azimuth of the receiver based on the phase of the FM component and the phase of the AM component. In some embodiments, a position of the receiver is determined based on the azimuth of the receiver. In some embodiments, the method further comprises: determining the position of the receiver based on the azimuth of the receiver.

In general, in one aspect, the invention features an apparatus comprising: a wireless receiver to receive a Very High Frequency (VHF) Omni-directional Radio Range (VOR) signal comprising an amplitude-modulated (AM) component; an analog-to-digital converter to generate a digital signal based on the VOR signal, the digital signal comprising data representing the AM component; and an AM phase circuit to determine a phase of the AM component of the VOR signal as received at a station remote from the apparatus based on the data representing the AM component.

In some embodiments, the AM phase circuit determines the phase of the AM component according to an acausal technique. In some embodiments, the AM phase circuit comprises: a digital signal processor. In some embodiments, an azimuth of the station with respect to a transmitter of the VOR signal is determined based on the phase of the AM component. Some embodiments comprise an azimuth circuit to determine the azimuth of the station. In some embodiments, the azimuth circuit corrects the azimuth of the station based on at least one correction signal, wherein each correction signal represents a difference between a first azimuth determined by a respective further station based on the VOR signal and a second azimuth determined by the respective further station based on one or more other signals. In some embodiments, the VOR signal further comprises a frequency-modulated (FM) component, the apparatus further comprising: a further wireless receiver to receive a signal representing a phase of the FM component of the VOR signal as received at the station; and an azimuth circuit to determine the azimuth of the station based on the phase of the AM component and the phase of the FM component. In some embodiments, a position of the station is determined based on the azimuth of the apparatus. Some embodiments comprise a position circuit to determine the position of the station based on the azimuth of the apparatus.

In general, in one aspect, the invention features an apparatus comprising: wireless receiver means for receiving a Very High Frequency (VHF) Omni-directional Radio Range (VOR) signal comprising an amplitude-modulated (AM) component; analog-to-digital converter means for generating a digital signal based on the VOR signal, the digital signal comprising data representing the AM component; and AM phase means for determining a phase of the AM component of the VOR signal as received at a station remote from the apparatus based on the data representing the AM component.

In some embodiments, the AM phase means determines the phase of the AM component according to an acausal technique. In some embodiments, an azimuth of the station with respect to a transmitter of the VOR signal is determined based on the phase of the AM component. Some embodiments comprise azimuth means for determining the azimuth of the station. In some embodiments, the azimuth means corrects the azimuth of the station based on at least one correction signal, wherein each correction signal represents a difference between a first azimuth determined by a respective further station based on the VOR signal and a second azimuth determined by the respective further station based on one or more other signals. In some embodiments, the VOR signal further comprises a frequency-modulated (FM) component, the apparatus further comprising: further wireless receiver means for receiving a signal representing a phase of the FM component of the VOR signal as received at the station; and azimuth means for determining the azimuth of the station based on the phase of the AM component and the phase of the FM component. In some embodiments, a position of the station is determined based on the azimuth of the apparatus. Some embodiments comprise position means for determining the position of the station based on the azimuth of the apparatus.

In general, in one aspect, the invention features a method comprising: receiving, at a first station, a Very High Frequency (VHF) Omni-directional Radio Range (VOR) signal comprising an amplitude-modulated (AM) component; generating a digital signal based on the VOR signal, the digital signal comprising data representing the AM component; and determining a phase of the AM component of the VOR signal as received at a second station remote from the first station based on the data representing the AM component.

In some embodiments, the phase of the AM component is determined according to an acausal technique. In some embodiments, an azimuth of the second station with respect to a transmitter of the VOR signal is determined based on the phase of the AM component. Some embodiments comprise determining the azimuth of the second station. Some embodiments comprise correcting the azimuth of the second station based on at least one correction signal, wherein each correction signal represents a difference between a first azimuth determined by a respective remote station based on the VOR signal and a second azimuth determined by the respective remote station based on one or more other signals. In some embodiments, the VOR signal further comprises a frequency-modulated (FM) component, the method further comprising:

receiving a signal representing a phase of the FM component of the VOR signal as received at the second station; and determining the azimuth of the second station based on the phase of the AM component and the phase of the FM component. In some embodiments, a position of the second station is determined based on the azimuth of the second station. Some embodiments comprise determining the position of the second station based on the azimuth of the second station.

In general, in one aspect, the invention features computer-readable media embodying instructions executable by a computer to perform a method comprising: generating a digital signal based on a Very High Frequency (VHF) Omni-directional Radio Range (VOR) signal received by a first station, the VOR signal comprising an amplitude-modulated (AM) component, the digital signal comprising data representing the AM component; and determining a phase of the AM component of the VOR signal as received at a second station remote from the first station based on the data representing the AM component.

In some embodiments, the phase of the AM component is determined according to an acausal technique. In some embodiments, an azimuth of the second station with respect to a transmitter of the VOR signal is determined based on the phase of the AM component. In some embodiments, the method further comprises: determining the azimuth of the second station. Some embodiments comprise correcting the azimuth of the second station based on at least one correction signal, wherein each correction signal represents a difference between a first azimuth determined by a respective further second station based on the VOR signal and a second azimuth determined by the respective further second station based on one or more other signals. In some embodiments, the VOR signal further comprises a frequency-modulated (FM) component, the method further comprising: determining a phase of the FM component of the VOR signal as received at the second station based on a signal received by the first station from the second station; and determining the azimuth of the second station based on the phase of the AM component and the phase of the FM component. In some embodiments, a position of the second station is determined based on the azimuth of the second station. In some embodiments, the method further comprises: determining the position of the second station based on the azimuth of the second station.

The details of one or more implementations are set forth in the accompanying drawings and the description below. Other features will be apparent from the description and drawings, and from the claims.

Figure 1:
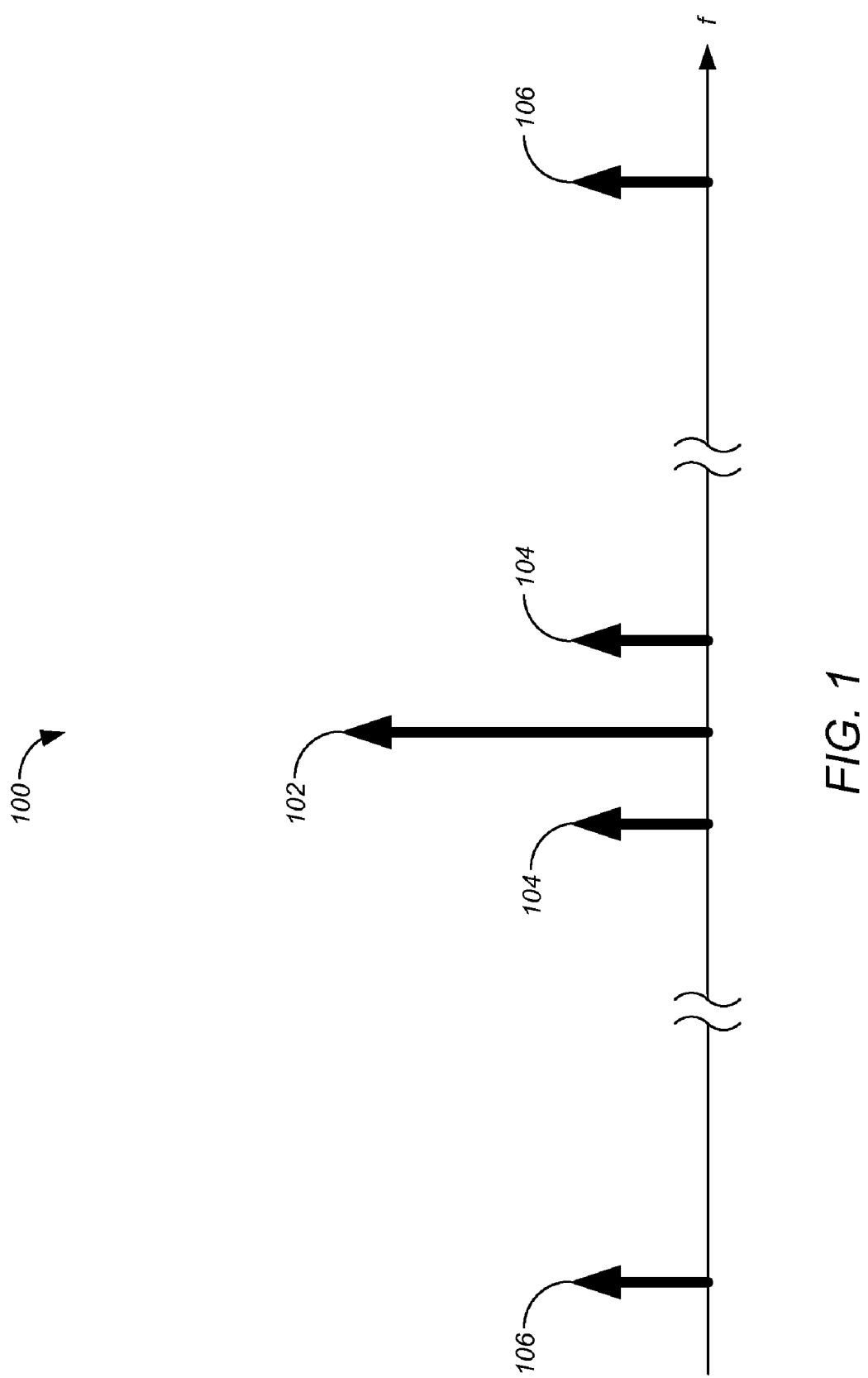
FIG. 1 shows the spectrum of a conventional VOR signal.

The leading digit(s) of each reference numeral used in this specification indicates the number of the drawing in which the reference numeral first appears.

DETAILED DESCRIPTION

Embodiments of the present invention provide ways to maximize the azimuth estimation accuracy for a given received VOR signal power, and to evaluate the accuracy of this estimate, using digital signal processing techniques. Equivalently, embodiments of the present invention minimize the received power necessary to achieve a desired azimuth estimation accuracy, thus extending the useful footprint of a VOR transmitter.

Though VOR transmitters were originally deployed for the purpose of aircraft navigation, they can also be used by ground-based receivers. A two-dimensional position fix can be achieved by combining azimuth measurements from multiple VOR transmitters, or by combining azimuth measurements with range measurements or time differences of arrival (TDOA) derived from other types of signals.

VOR systems use the phase relationship between two transmitted 30 Hz signals to encode azimuth. FIG. 1 shows the spectrum 100 of a conventional VOR signal. Spectrum 100 comprises a VHF carrier 102, an AM component 104 comprising a simple AM tone offset 30 Hz from carrier 102, and an FM component 106 comprising a 30 Hz signal that is FM modulated on a 9960 Hz subcarrier. By means of an electrically rotating phased-array antenna, the phase difference between the two 30 Hz signals encodes the azimuth from the VOR transmitter.

The baseband modulating waveform for a VOR transmitter is given by $$m(t) = 1 + 0.3 \cos(2\pi f_m t + \theta_{AM}) + 0.3 \cos(2\pi f_{sc} t + 16 \cos(2\pi f_m t + \theta_{FM})) \quad (1)$$

where
$f_m = 30$ Hz
$f_{sc} = 9960$ Hz
$\phi = \theta_{AM} - \theta_{FM}$

Taken left-to-right, the terms in equation (1) represent carrier 102, AM component 104, and FM component 106. The value of $\phi$ encodes the azimuth from the transmitter with respect to magnetic north.

Figure 2:
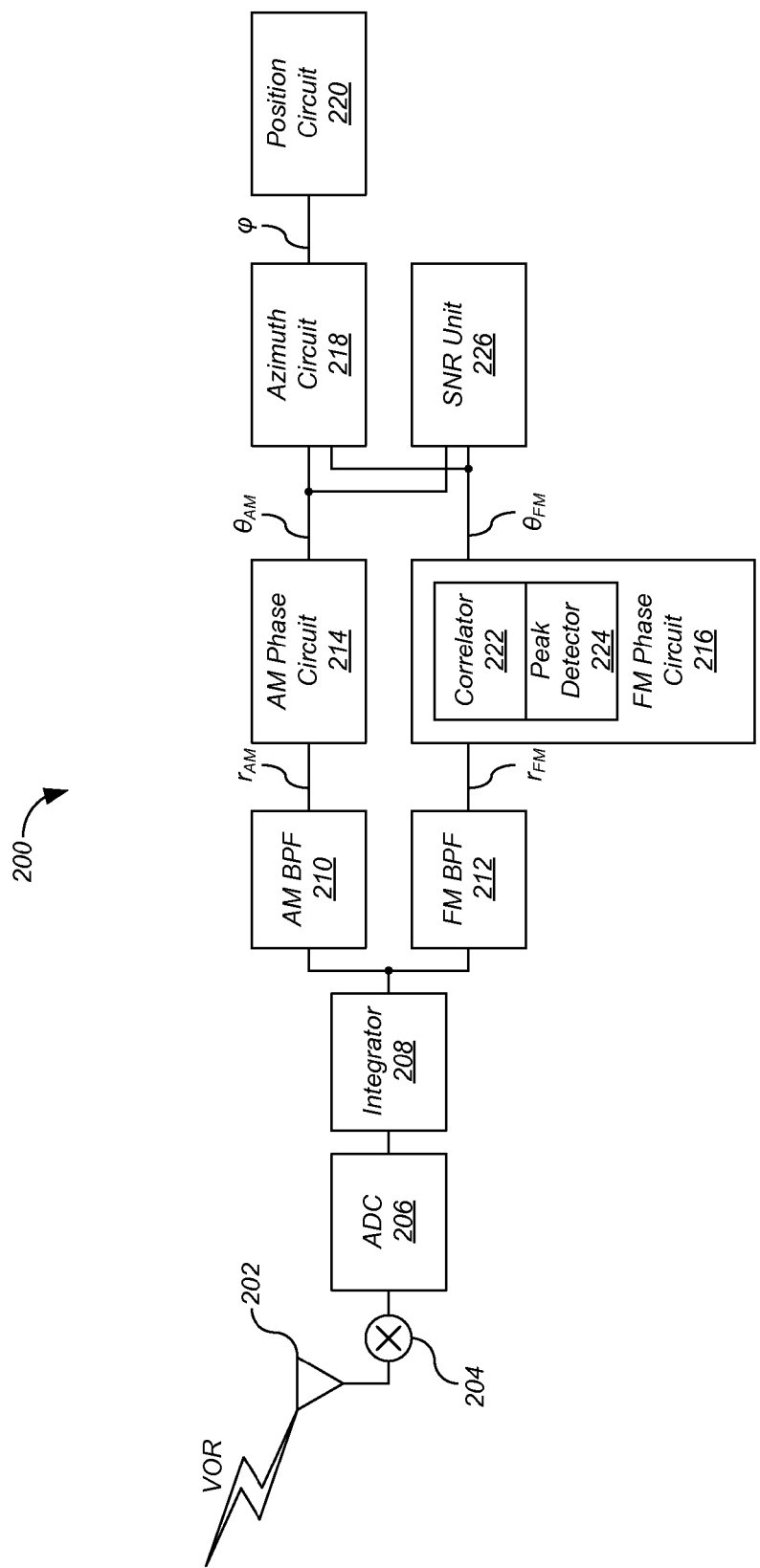
FIG. 2 shows a VOR receiver according to an embodiment of the present invention.

FIG. 2 shows a VOR receiver 200 according to an embodiment of the present invention. VOR receiver 200 comprises an antenna 202, a mixer 204, an analog-to-digital converter (ADC) 206, an integrator 208, an AM bandpass filter (BPF) 210, an FM BPF 212, an AM phase circuit 214, an FM phase circuit 216, an azimuth circuit 218, and a position circuit 220. FM phase circuit 216 preferably comprises a correlator 222 and a peak detector 224. AM BPF 210, FM BPF 212, AM phase circuit 214, FM phase circuit 216, azimuth circuit 218, and position circuit 220 can be implemented as one or more digital signal processors.

Figure 3:
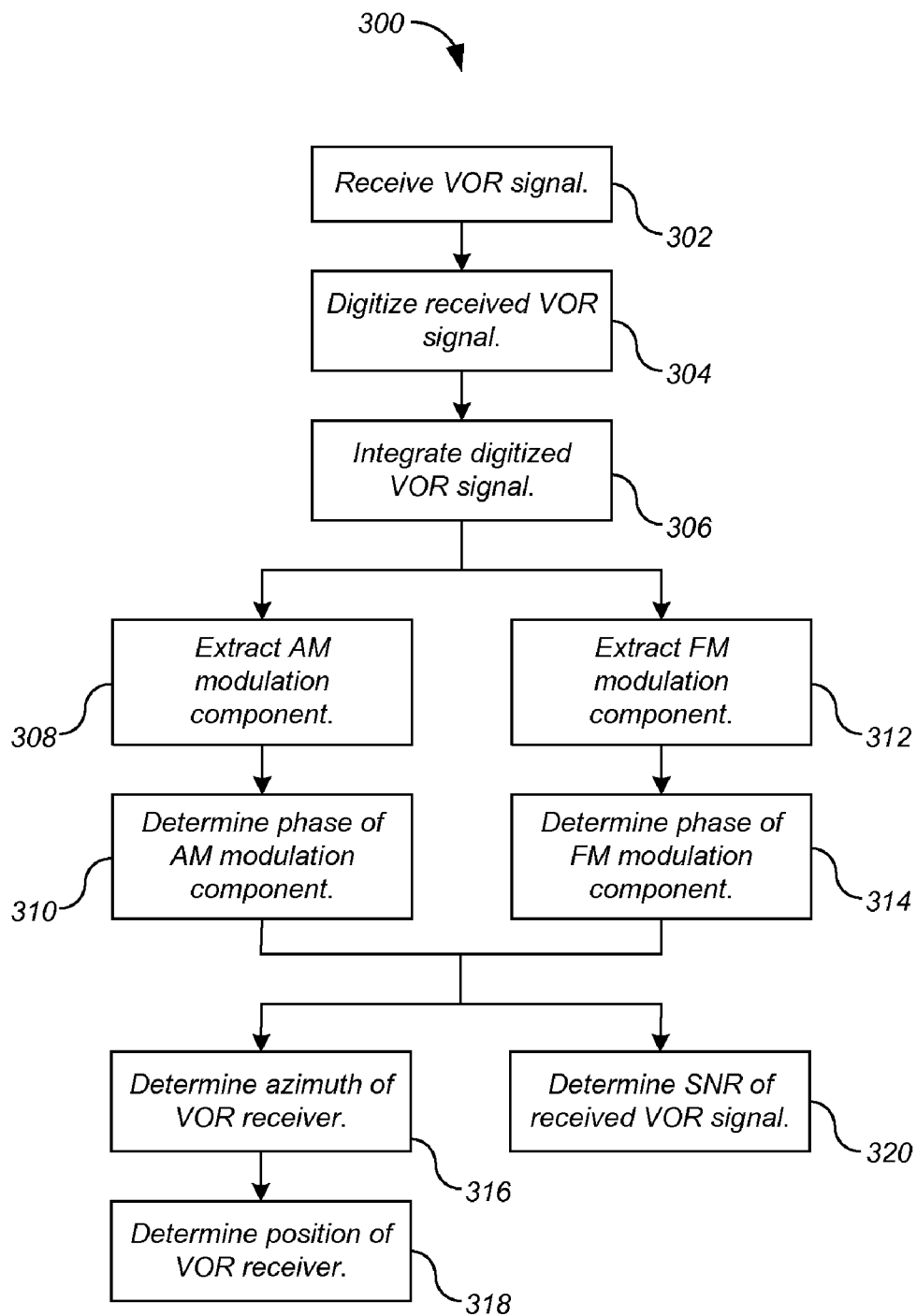
FIG. 3 shows a process for the VOR receiver of FIG. 2 according to an embodiment of the present invention.

FIG. 3 shows a process 300 for VOR receiver 200 of FIG. 2 according to an embodiment of the present invention. Although in the described embodiments, the elements of process 300 are presented in one arrangement, other embodiments may feature other arrangements, as will be apparent to one skilled in the relevant arts based on the disclosure provided herein.

Antenna 202 receives a VOR signal (step 302). Embodiments of the present invention employ digital signal processing techniques. Hence, VOR receiver 200 digitizes the received VOR signal (step 304). In particular, mixer 204 mixes the received VOR signal down to baseband, and ADC 206 digitizes the signal at a sampling frequency of $f_s$, though not necessarily in that order.

The VOR signal is periodic with a frequency of 30 Hz, so in some embodiments coherent integration is employed, for example using a phase-locked loop (PLL) locked to carrier 102. This integration serves not only to lower the White Gaussian noise level, but also acts as a comb filter to attenuate tone-like signals and noise except at the frequencies of interest, which are all non-zero multiples of 30 Hz. In these embodiments, integrator 208 integrates the digitized VOR signal (step 306). The recovered discrete-time signal r(n) consists of the transmitted signal m(n/f$_s$) plus noise ε(n/f$_s$), as shown in equation (2).

$$r(n) = m(n/f_s) + \epsilon(n/f_s) \quad (2)$$

After integration, the signal is split into two components: one component $r_{AM}(n)$ for analysis of AM component 104, and one component $r_{FM}(n)$ for analysis of FM component 106. AM BPF 210 extracts the AM component, $r_{AM}(n)$ (step 308), by bandpass filtering around 30 Hz (in addition to any comb-filtering that took place as a result of coherent integration at integrator 208).

AM phase circuit 114 determines the phase $\theta_{AM}$ of AM component 104 (step 310), for example using an acausal technique such as that shown in equation (3).

$$\theta_{AM} = -\tan^{-1}\left(\frac{\sum_{n=0}^{N-1} r(n)\sin(\omega_m n)}{\sum_{n=0}^{N-1} r(n)\cos(\omega_m n)}\right) \quad (3)$$

where
$\omega_m = 2\pi f_m/f_s$
$f_s$ = sample rate
$N = f_s/30$

Equation (3) represents an approximate Maximum Likelihood estimate of the phase angle of a sinusoid in Gaussian white noise. For typical desired azimuth accuracies, the estimator of equation (3) is nearly unbiased and exhibits performance close to the Cramer-Rao lower bound, which is given by equation (4).

$$CRLB(\sigma) \cong \left(\sqrt{\frac{1}{CNR \cdot \sum_{n=0}^{N} \sin^2(\omega_m n)}}\right) \text{radians} \quad (4)$$

Hence, no better estimate of AM phase angle can be obtained. In equation 4, CNR refers to the carrier-to-noise ratio of the 30 Hz sideband, not the RF carrier.

Equation (4) indicates that the phase estimate error decreases roughly inverse-proportionally to the square root of the number of samples. Hence, the phase accuracy estimate can be improved by oversampling beyond the Nyquist limit.

FM BPF 212 extracts FM component 106, $r_{FM}(n)$ (step 312), by bandpass filtering to approximately 9960 Hz+/−480 Hz. FM phase circuit 116 determines the phase $\theta_{FM}$ of FM component 106 (step 314). In particular, Correlator 222 performs a circular cross-correlation between FM component 106, $r_{FM}(n)$ and an ideal representation of the FM component, for example according to equation (5), thereby generating a correlation peak.

$$x(n) = \cos\left(2\pi\frac{f_{sc}}{f_s}n + 16\cos\left(2\pi\frac{f_m}{f_s}n\right)\right) * r_{FM}(n) \quad (5)$$

Peak detector 224 determines the phase $\theta_{FM}$ of FM component 106 based on the position of the correlation peak, for example according to equation (6).

$$\theta_{FM} = \left(2\pi\frac{f_m}{f_s}m : x(m) = \max_{i=0}^{N}(x(i))\right) \quad (6)$$

Azimuth circuit 218 determines the azimuth $\phi$ of VOR receiver 200 (step 316) by taking the difference between the phase $\theta_{AM}$ of AM component 104 and the phase $\theta_{FM}$ of FM component 106, as shown in equation (7).

$$\phi = \theta_{AM} - \theta_{FM} \quad (7)$$

Position circuit 220 determines the position of VOR receiver 200 based on the azimuth $\phi$ of VOR receiver 200 (step 318), in combination with for example the location of the VOR transmitter and other measurements such as measurements of other VOR signals or other signals such as GPS, TV, FM, and the like.

In some embodiments, VOR receiver 200 determines the signal-to-noise ratio (SNR) of the received VOR signal (step 320). In these embodiments, referring again to FIG. 2, VOR receiver 200 also includes a SNR unit 226. SNR unit 226 reconstructs the VOR signal based on the estimated phase $\theta_{AM}$ of AM component 104 and the estimated phase $\theta_{FM}$ of FM component 106, for example using least squares fitting or the like. The reconstructed VOR signal is then subtracted from the received VOR signal to estimate the SNR of the received VOR signal. The SNR can be used to compute the variance in the estimate of the azimuth $\phi$.

Ideally, an error-free measurement of the value of $\phi$ would represent the azimuth of a line extending from the VOR transmitter to VOR receiver 200 with respect to magnetic north. However, VOR transmitters generally do not exhibit the degree of accuracy desired for precision fixes (about 1 milliradian). For one, the initial alignment of the VOR transmitter to magnetic north may not be perfect. Second, the direction of magnetic north with respect to true north evolves over time and most VOR transmitters are never realigned after initial installation. Third, phase shifts may occur as the VOR transmitter electronics age.

In some embodiments, these problems are addressed by a monitoring system that accurately measures the transmitted value of $\phi$ from a known azimuth. The monitoring system includes monitor stations having clear line-of-sight to the VOR transmitter and sufficiently high SNR to achieve high measurement accuracy of $\phi$. The difference between the true azimuth, $\phi$, and the transmitted value, $\phi_{transmitted}$, represents the VOR transmitter's azimuth error, $\phi_{error}$, as shown in equation (8).

$$\phi_{transmitted} = \phi + \phi_{error} \quad (8)$$

The value of the VOR transmitter's azimuth error, $\phi_{error}$, can be continuously monitored and used to correct the measured azimuth of roaming VOR receivers such as VOR receiver 200.

Another problem in this category is "scalloping", a variation in $\phi_{error}$ that is quasi-periodic over azimuth. This error is primarily the result of multipath, particularly from terrain or objects near the VOR transmitter. Hence, the value of $\phi_{error}$ is a function of azimuth and range (though the dependence on range is expected to be weak as it grows larger), as shown in equation (9).

$$\phi_{transmitted} = \phi + \phi_{error}(\phi, r) \quad (9)$$

It is impractical to scatter thousands of dedicated monitoring stations to derive azimuth correction factors at the level of granularity required for high-precision azimuth measurements. However, the individual mobile users of a hybrid positioning service can instead be aggregated to develop these correction factors, effectively serving as a distributed monitoring network. Each one of these user receivers employs multiple positioning technologies to generate a position, for example using GPS, TV, FM, VOR, and the like. When a VOR measurement is made by a receiver device, but an accurate position of that receiver can be determined without making use of the VOR measurement, then the difference between the actual and measured azimuth can be transmitted to a central server. (If the position of the receiver is known, so is its azimuth and range with respect to any VOR transmitter.) By filtering and interpolation, the server gradually generates an estimate of the VOR correction factors for all azimuths and ranges, as shown in equation (10).

$$\phi = \phi_{measured} + \phi'_{error}(\phi_{measured}, r) \quad (10)$$

For a given CNR, the phase estimate of the phase $\theta_{FM}$ of FM component 106 is less accurate than the phase estimate of the phase $\theta_{AM}$ of AM component 104. Experimentally, the AM measurement also appears to be more sensitive to real-world distortion and interference. In some embodiments, a monitoring system similar to the one described above allows VOR receiver 200 to avoid the use of the AM portion of the signal, while increasing both the azimuth measurement's accuracy and its robustness.

According to these embodiments, the phase $\theta_{AM}$ of AM component 104 as it appears at VOR receiver 200 is reconstructed from measurements collected at a monitor station. The monitor station measures both the phase $\theta_{AM}$ of AM component 104 and the frequency of the AM subcarrier, $\omega_{AM}$. (Although $\omega_{AM}$ is nominally 30 Hz, it may deviate from this standard by a small amount.)

Figure 4:
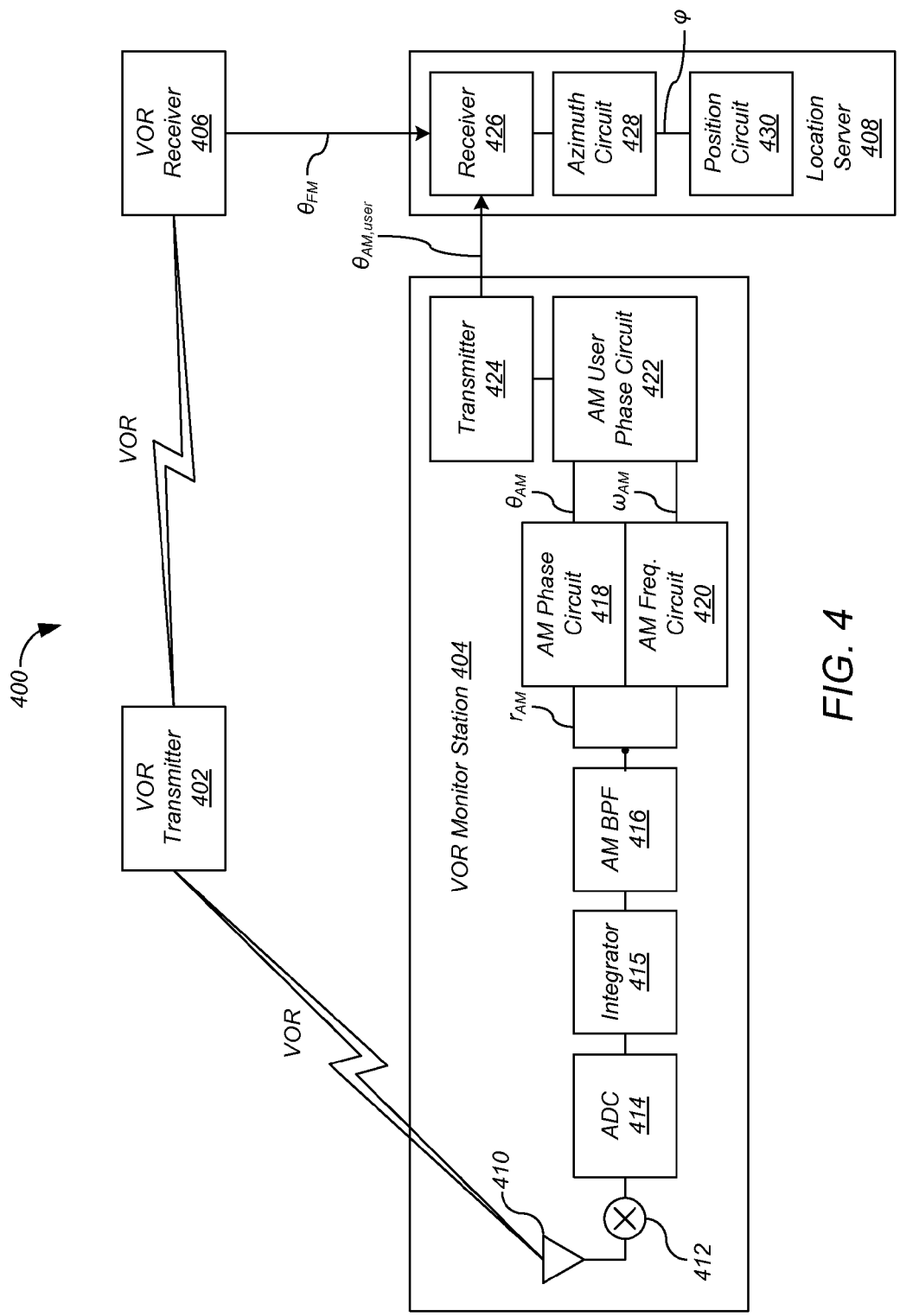
FIG. 4 shows a position determination system according to an embodiment of the present invention.

FIG. 4 shows a position determination system 400 according to an embodiment of the present invention. Position determination system 400 comprises a VOR transmitter 402, one or more VOR monitor stations 404, one or more VOR receivers 406, and a location server 408. According to these embodiments, VOR receivers 406 can be implemented as described above for VOR receiver 200 of FIG. 2, but without the need for AM signal processing elements such as AM BPF 210, AM phase circuit 214, and the like.

VOR monitor station 404 comprises an antenna 410, a mixer 412, an analog-to-digital converter (ADC) 414, an integrator 415, an AM BPF 416, an AM phase circuit 418, an AM frequency circuit 420, an AM user phase circuit 422, and a transmitter 424. Location server 408 comprises a receiver 426, an azimuth circuit 428, and a position circuit 430. Elements of position determination system 400 can be implemented as one or more digital signal processors.

Figure 5:
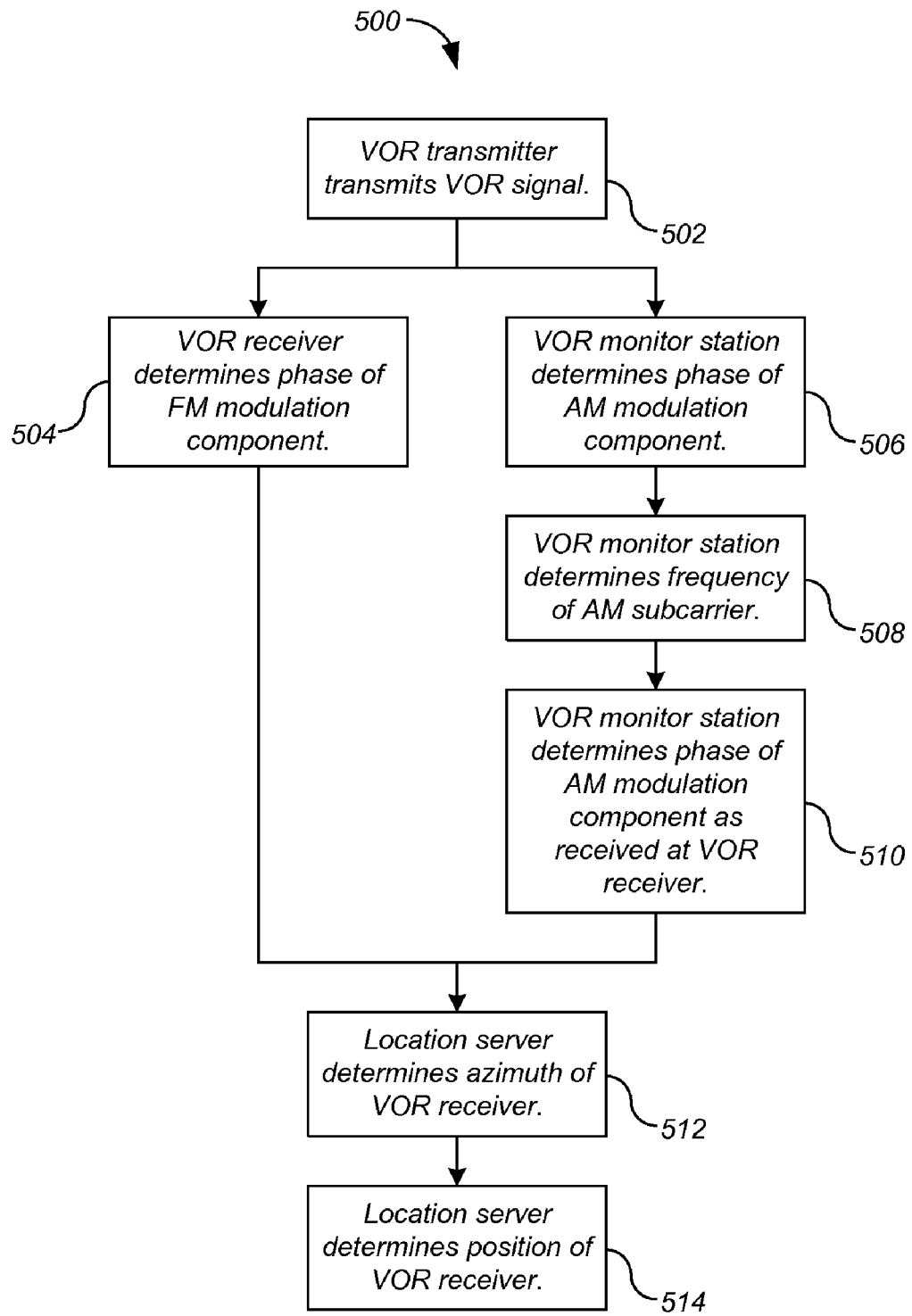
FIG. 5 shows a process for the position determination system of FIG. 4 according to an embodiment of the present invention.

FIG. 5 shows a process for position determination system 400 of FIG. 4 according to an embodiment of the present invention. VOR transmitter 402 transmits a conventional VOR signal (step 502). VOR receiver 406 receives the VOR signal, determines the phase $\theta_{FM}$ of FM component 106 as described above (step 504), and communicates phase $\theta_{FM}$ to location server 408.

VOR monitor station 404 also receives the VOR signal. AM phase circuit 418 determines the phase $\theta_{AM,monitor}$ of AM component 104 as received at VOR monitor station 404 (step 506), for example using the techniques described above for VOR receiver 200 of FIG. 2. AM frequency circuit 420 of VOR monitor station 404 determines the frequency of the AM subcarrier, $\omega_{AM}$ (step 508). AM user phase circuit 422 determines the phase $\omega_{AM,user}$ of AM component 104 as received at VOR receiver 406 based on the values of $\theta_{AM,monitor}$ and $\omega_{AM}$ plus knowledge of time t at VOR receiver 406, time $t_0$ of the measurement at VOR monitor station 404, the range $r_{monitor}$ between VOR monitor station 404 and VOR transmitter 402, and a coarse estimate of the range $r_{user}$ between VOR receiver 406 and VOR transmitter 402 (step 510), for example according to equation (11).

$$\theta_{AM,user}(t) = \theta_{AM,monitor}(t_0) + \omega_{AM} \cdot (t - t_0) + \omega_{AM} \cdot \left(\frac{r_{monitor} - r_{user}}{c}\right) \quad (11)$$

Transmitter 424 communicates the value of phase $\theta_{AM,user}$ to location server 408. Receiver 426 of location server receives the value of phase $\theta_{AM,user}$. Azimuth circuit 428 determines the azimuth $\phi$ of VOR receiver 406 (step 512) by taking the difference between the reconstructed phase $\theta_{AM,user}$ received from VOR monitor station 404 and the phase $\theta_{FM}$ of FM component 106 received from VOR receiver 406, for example as shown in equation (12).

$$\phi = \theta_{AM,user} - \theta_{FM} \quad (12)$$

Position circuit 430 of location server 408 determines the position of VOR receiver 406 based on the azimuth $\phi$ of VOR receiver 406 (step 514), for example in combination with the location of VOR transmitter 402 and other measurements such as measurements of other VOR signals or other signals such as GPS, TV, FM, and the like.

Referring again to equation (11), the latter term compensates for the range difference from VOR transmitter 402 to VOR monitor station 404 and VOR receiver 406. While the range $r_{monitor}$ between VOR monitor station 404 and VOR transmitter 402 can be surveyed very accurately, for example with GPS, the range $r_{user}$ between VOR receiver 406 and VOR transmitter 402 need only be known to within about ±10 km in order to ensure that its phase error contribution is less than 1 milliradian.

The absolute time t at VOR receiver 406 can be determined by an accurate local clock or through a time-transfer mechanism, for example such as one that relies on the reception of RF signals with a known emission time combined with constraints on the range $r_{user}$ between VOR receiver 406 and VOR transmitter 402 and the like. For 1 milliradian maximum error, equation (11) implies that range $r_{user}$ need only be known to within about ±1.6 km. In dense urban areas, this is larger than the size of a cellular site's service radius. Hence, knowledge of the serving tower in conjunction with an RF synchronizing signal provides sufficiently accurate position to accurately reconstruct the phase $\theta_{AM,user}$ of AM component 104 as received at VOR receiver 406.

If time t at VOR receiver 406 is known with high accuracy, but the range $r_{user}$ from VOR transmitter 402 is not, the phase $\theta_{AM,user}$ of AM component 104 as received at VOR receiver 406 can still be reconstructed with relatively high precision, thereby allowing an estimate of azimuth $\phi$ of VOR receiver 406 to be made which, in turn, may be combined with other known constraints about the position of VOR receiver 406, for example a line of position estimated from TDOA signals, to iteratively improve the position estimate for VOR receiver 406. At each step, the position estimate is used to reduce the uncertainty bounds of the range $r_{user}$ between VOR transmitter 402 and VOR receiver 406.

Even when only a very coarse time transfer to VOR receiver 406 is possible, a line of position can be formed using a pair of VOR transmitters 402. This line of position represents a constant azimuth difference between the two VOR transmitters 402, as shown in equation (13).

$$\phi_1 - \phi_2 = (\theta_{AM1} - \theta_{FM1}) - (\theta_{AM2} - \theta_{FM2}) = k \quad (13)$$

The shape of this constraint is a circular arc that joins the pair of VOR transmitters 402 and passes through the position of VOR receiver 406. The constant k is formed by a combination of user and monitor measurements. According to these embodiments, the AM measurements are made only at VOR monitor stations 404, where they will have high accuracy due to high SNR and a guaranteed direct path to the VOR, as shown in equation (14).

$$\theta_{AM1,monitor}(t_0) - \theta_{AM2,monitor}(t_0) + (\omega_{AM1} - \omega_{AM2})(t - t_0) - \theta_{FM1,user}(t) + \theta_{FM2,user}(t) = k \quad (14)$$

Note that the term reflecting the range $r_{user}$ between VOR transmitter 402 and VOR receiver 406 has been discarded since it is negligible. Also, since the ratio of $\omega_{AM1}$ to $\omega_{AM2}$ is very close to one, the value of the $(\omega_{AM1}-\omega_{AM2})$ term is small (perhaps $10^{-2}$ to $2\cdot10^{-4}$), so the value of k is relatively insensitive to the exact time at which the measurement is made. For example, if the relative rates of two VOR transmitters 402 differ by 1 ppm, then even a time transfer error of 5 seconds at VOR receiver 406 would result in less than 1 milliradian of estimation error in the value of k.

Multiple lines of position can be formed from multiple pairs of VOR transmitters 402, and their intersection yields the two-dimensional position of VOR receiver 406. Similarly, lines of position from combinations of pairs of VOR transmitters 402 and TDOA ranging pairs from other types of signals such as TV, FM, and the like, can be combined to produce a position fix.

While in the described embodiments, the elements and processes of VOR receiver 200 of FIG. 2 and position determination system 400 of FIG. 4 are described in particular arrangements, in other embodiments, the elements and processes are distributed in other arrangements. For example, all or part of location server 408 can be implemented within VOR monitor unit 404 or VOR receiver 406. As another example, all or part of VOR monitor unit 404 can be implemented within VOR receiver 406 or location server 408. In these arrangements, the required measurements are transferred among the units as needed. For example, AM user phase circuit 422 can be implemented within VOR monitor unit 404 or VOR receiver 406. In these embodiments, VOR monitor unit transmits the phase $\theta_{AM,monitor}$ of AM component 104 as received at VOR monitor station 404 and the frequency of the AM subcarrier, $\omega_{AM}$, to the unit comprising AM user phase circuit 422, which determines the phase $\theta_{AM,user}$ of AM component 104 as received at VOR receiver 406. Of course, other arrangements are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A method comprising:
   receiving, at a first station, a Very High Frequency (VHF) Omni-directional Radio Range (VOR) signal comprising an amplitude-modulated (AM) component;
   generating a digital signal based on the VOR signal, the digital signal comprising data representing the AM component; and
   determining a phase of the AM component of the VOR signal as received at a second station based on the data representing the AM component, wherein the second station is remote from the first station.

2. The method of claim 1:
   wherein an azimuth of the second station with respect to a transmitter of the VOR signal is determined based on the phase of the AM component.

3. The method of claim 2, further comprising:
   determining the azimuth of the second station.

4. The method of claim 3, further comprising:
   correcting the azimuth of the second station based on at least one correction signal, wherein each correction signal represents a difference between a first azimuth determined by a respective remote station based on the VOR signal and a second azimuth determined by the respective remote station based on one or more other signals.

5. The method of claim 2, wherein the VOR signal further comprises a frequency-modulated (FM) component, the method further comprising:
   receiving a signal representing a phase of the FM component of the VOR signal as received at the second station; and
   determining the azimuth of the second station based on the phase of the AM component and the phase of the FM component.

6. The method of claim 5:
   wherein a position of the second station is determined based on the azimuth of the second station.

7. The method of claim 5, further comprising:
   determining the position of the second station based on the azimuth of the second station.

8. Computer-readable media embodying instructions executable by a computer to perform a method comprising:
   generating a digital signal based on a Very High Frequency (VHF) Omni-directional Radio Range (VOR) signal received by a first station, the VOR signal comprising an amplitude-modulated (AM) component, the digital signal comprising data representing the AM component; and
   determining a phase of the AM component of the VOR signal as received at a second station based on the data representing the AM component, wherein the second station is remote from the first station.

9. The computer-readable media of claim 8:
   wherein an azimuth of the second station with respect to a transmitter of the VOR signal is determined based on the phase of the AM component.

10. The computer-readable media of claim 9, wherein the method further comprises:
    determining the azimuth of the second station.

11. The computer-readable media of claim 10, wherein the method further comprises:
    correcting the azimuth of the second station based on at least one correction signal, wherein each correction signal represents a difference between a first azimuth determined by a respective further second station based on the VOR signal and a second azimuth determined by the respective further second station based on one or more other signals.

12. The computer-readable media of claim 9, wherein the VOR signal further comprises a frequency-modulated (FM) component, the method further comprising:

determining a phase of the FM component of the VOR signal as received at the second station based on a signal received by the first station from the second station; and determining the azimuth of the second station based on the phase of the AM component and the phase of the FM component.

13. The computer-readable media of claim 12:

wherein a position of the second station is determined based on the azimuth of the second station.

14. The computer-readable media of claim 12, wherein the method further comprises:

determining the position of the second station based on the azimuth of the second station.

* * * * *